US012770269B2

(12) United States Patent
Kwon et al.

(10) Patent No.: US 12,770,269 B2
(45) Date of Patent: Oct. 20, 2026

(54) TRAINING AND USING MACHINE LEARNING MODELS TO PROVIDE COUNTERFACTUAL EXPLANATIONS OF PREDICTIONS

(71) Applicant: INTERNATIONAL BUSINESS MACHINES CORPORATION, Armonk, NY (US)

(72) Inventors: Bum Chul Kwon, Cambridge, MA (US); Grace Guo, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 18/757,506

(22) Filed: Jun. 28, 2024

(65) Prior Publication Data

US 2026/0004432 A1 Jan. 1, 2026

(51) Int. Cl.
*G06T 7/155* (2017.01)
*G06T 7/00* (2017.01)

(52) U.S. Cl.
CPC ............ *G06T 7/155* (2017.01); *G06T 7/0012* (2013.01); *G06T 2207/20081* (2013.01)

(58) Field of Classification Search
CPC ................... G06T 7/155; G06T 7/0012; G06T 2207/20081; G06T 2207/10088; G06T 2207/20084; G06T 2207/30048; G06T 7/11
See application file for complete search history.

(56) References Cited

U.S. PATENT DOCUMENTS

| | | | | |
|---|---|---|---|---|
| 10,262,236 | B2 * | 4/2019 | Lim | G06F 18/28 |
| 10,929,719 | B2 | 2/2021 | Tong et al. | |
| 10,944,767 | B2 | 3/2021 | Goswami et al. | |

(Continued)

OTHER PUBLICATIONS

Grace Period Disclosure: Guo, et al., "MIMICRI: Towards Domain-Centered Counterfactual Explanations of Cardiovascular Image Classification Models," 14pp., arXiv:2404.16174v1, Apr. 24, 2024.

(Continued)

*Primary Examiner* — Stephen R Koziol
*Assistant Examiner* — Michael Kim Maiden
(74) *Attorney, Agent, or Firm* — Seed Intellectual Property Law Group LLP

(57) ABSTRACT

Provided are techniques for training and using machine learning models to provide counterfactual explanations of predictions. An Artificial Intelligence (AI) predictive model is trained. The AI predictive model is used to generate a prediction label for each item of a plurality of input items. A target item with an initial prediction label. For a morphological segment, a source item is identified from the plurality of input items, where the source item shares common structural features with the target item and has a different prediction label. A recombined item is generated by: masking the morphological segment in the target item and adding the morphological segment of the source item. The AI predictive model is used to generate a new prediction label for the recombined item. It is determined that the new prediction label is different from the initial prediction label and that the recombined item is a counterfactual item.

20 Claims, 14 Drawing Sheets

(56) References Cited

U.S. PATENT DOCUMENTS

| | | | |
|---|---|---|---|
| 11,455,515 | B2 | 9/2022 | Kolter |
| 2023/0245426 | A1 | 8/2023 | Lin |

OTHER PUBLICATIONS

"Welcome to Shapash's documentation!," shapash, 9 pp., [online][retrieved Jun. 20, 2024] [https://shapash.readthedocs.io/en/latest/].

"Local Interpretable Model-Agnostic Explanations (lime)," 29 pp., [online][retrieved Jun. 20, 2024] [https://lime-ml.readthedocs.io/en/latest/].

Jacob, et al., "STEEX: Steering Counterfactual Explanations with Semantics," 29 pp., arXiv:2111.09094v3, Jul. 18, 2022, In European Conference on Computer Vision.

Mertes, Sylvan et al., "GANterfactual—Counterfactual Explanations for Medical Non-experts Using Generative Adversarial Learning", 19 pp., Frontiers in Artificial Intelligence, [(first published Dec. 22, 2020 (v1), last revised Aug. 5, 2021 (this version, v3)) <retrieved Apr. 5, 2024 at 1:46 PM > (https://www.frontiersin.org/articles/10.3389/frai.2022.825565/full)].

Selvaraju, et al., "Grad-CAM: Visual Explanations from Deep Networks via Gradient-based Localization," 9 pp., Computer Vision Foundation, In Proceedings of the IEEE International Conference on Computer Vision, 2017.

Suzuki, M. et al., "Understanding the Reason for Misclassification by Generating Counterfactual Images," 5 pp., 2021 17th International Conference on Machine Vision and Applications (MVA), Aichi, Japan, 2021, doi: 10.23919/MVA51890.2021.9511352, Date of Conference: Jul. 25-27, 2021, date Added to IEEE Xplore: Aug. 19, 2021 <retrieved Apr. 5, 2024 at 12:03 PM> (https://ieeexplore.ieee.org/abstract/document/9511352).

Vandenhende, et al., "Making Heads or Tails: Towards Semantically Consistent Visual Counterfactuals," 33 pp., arXiv:2203.12892v2, Jul. 16, 2022.

Wexler, James et al., "The What-If Tool: Interactive Probing of Machine Learning Models", 10 pp., IEEE Transactions on Visualization and Computer Graphics Jan. 2020 [(first published on Jul. 9, 2019 (v1), last revised Oct. 3, 2019 (this version, v2)) <retrieved Apr. 5, 2024 at 12:41 PM> (https://arxiv.org/abs/1907.04135v2)].

Yang, et al., "Bi-Modality Medical Image Synthesis Using Semi-Supervised Sequential Generative Adversarial Networks", 11 pp., arXiv:2308.14066v2, Aug. 29, 2023 [arXiv.org, first published Aug. 27, 2023 (v1), last revised Aug. 29, 2023 (this version, v2)) <retrieved Apr. 5, 2024 at 9:50 AM> (https://arxiv.org/abs/2308.14066)].

Zemni, et al., "OCTET: Object-aware Counterfactual Explanations," 10 pp., Computer Vision Foundation, in Proceedings of the IEEE/CVF Conference on Computer Vision and Pattern Recognition, 2023.

* cited by examiner

930

TRAINING AND USING MACHINE LEARNING MODELS TO PROVIDE COUNTERFACTUAL EXPLANATIONS OF PREDICTIONS

BACKGROUND

Embodiments of the invention relate to training and using machine learning models to provide counterfactual explanations of predictions (i.e., prediction labels).

In recent years, the field of medical imaging has made advancements in the application of explainable Artificial Intelligence (AI) processes to provide insights into the decision-making processes of AI models. These explainable AI techniques may play a role in enhancing the trustworthiness and interpretability of AI processes, which may help clinical researchers test hypotheses and gain new knowledge in a reliable and transparent manner.

Prior approaches, such as feature visualization, saliency maps, and gradient-based techniques, have provided valuable insights into a model's internal workings. However, such explanation techniques fall short because users cannot explain how the structural and functional patterns of the human body captured in medical images and videos influence the AI prediction clearly.

SUMMARY

In accordance with certain embodiments, a computer program product comprising a computer readable storage medium having program code embodied therewith is provided, where the program code is executable by at least one computer processor to perform operations for training and using machine learning models to provide counterfactual explanations of predictions. In such embodiments, an Artificial Intelligence (AI) predictive model is trained. The AI predictive model is used to generate a prediction label for each item of a plurality of input items. A target item is selected from the plurality of input items, where the target item has an initial prediction label. For a morphological segment, a source item is identified from the plurality of input items, where the source item shares common structural features with the target item and has a different prediction label. A recombined item is generated by: masking the morphological segment in the target item and adding the morphological segment of the source item over the masked morphological segment. The AI predictive model is used to generate a new prediction label for the recombined item. It is determined that the new prediction label is different from the initial prediction label. It is indicated that the recombined item is a counterfactual item, where the morphological segment of the source item changed the prediction label of the recombined item.

In accordance with other embodiments, a computer system comprises one or more computer processors, one or more computer-readable memories and one or more computer-readable, tangible storage devices; and program instructions, stored on at least one of the one or more computer-readable, tangible storage devices for execution by at least one of the one or more computer processors via at least one of the one or more memories, to perform operations for training and using machine learning models to provide counterfactual explanations of predictions. In such embodiments, an Artificial Intelligence (AI) predictive model is trained. The AI predictive model is used to generate a prediction label for each item of a plurality of input items. A target item is selected from the plurality of input items, where the target item has an initial prediction label. For a morphological segment, a source item is identified from the plurality of input items, where the source item shares common structural features with the target item and has a different prediction label. A recombined item is generated by: masking the morphological segment in the target item and adding the morphological segment of the source item over the masked morphological segment. The AI predictive model is used to generate a new prediction label for the recombined item. It is determined that the new prediction label is different from the initial prediction label. It is indicated that the recombined item is a counterfactual item, where the morphological segment of the source item changed the prediction label of the recombined item.

In accordance with yet other embodiments, a computer-implemented method is provided for training and using machine learning models to provide counterfactual explanations of predictions. In such embodiments, an Artificial Intelligence (AI) predictive model is trained. The AI predictive model is used to generate a prediction label for each item of a plurality of input items. A target item is selected from the plurality of input items, where the target item has an initial prediction label. For a morphological segment, a source item is identified from the plurality of input items, where the source item shares common structural features with the target item and has a different prediction label. A recombined item is generated by: masking the morphological segment in the target item and adding the morphological segment of the source item over the masked morphological segment. The AI predictive model is used to generate a new prediction label for the recombined item. It is determined that the new prediction label is different from the initial prediction label. It is indicated that the recombined item is a counterfactual item, where the morphological segment of the source item changed the prediction label of the recombined item.

BRIEF DESCRIPTION OF THE DRAWINGS

Referring now to the drawings in which like reference numbers represent corresponding parts throughout.

DETAILED DESCRIPTION

Figure 1:
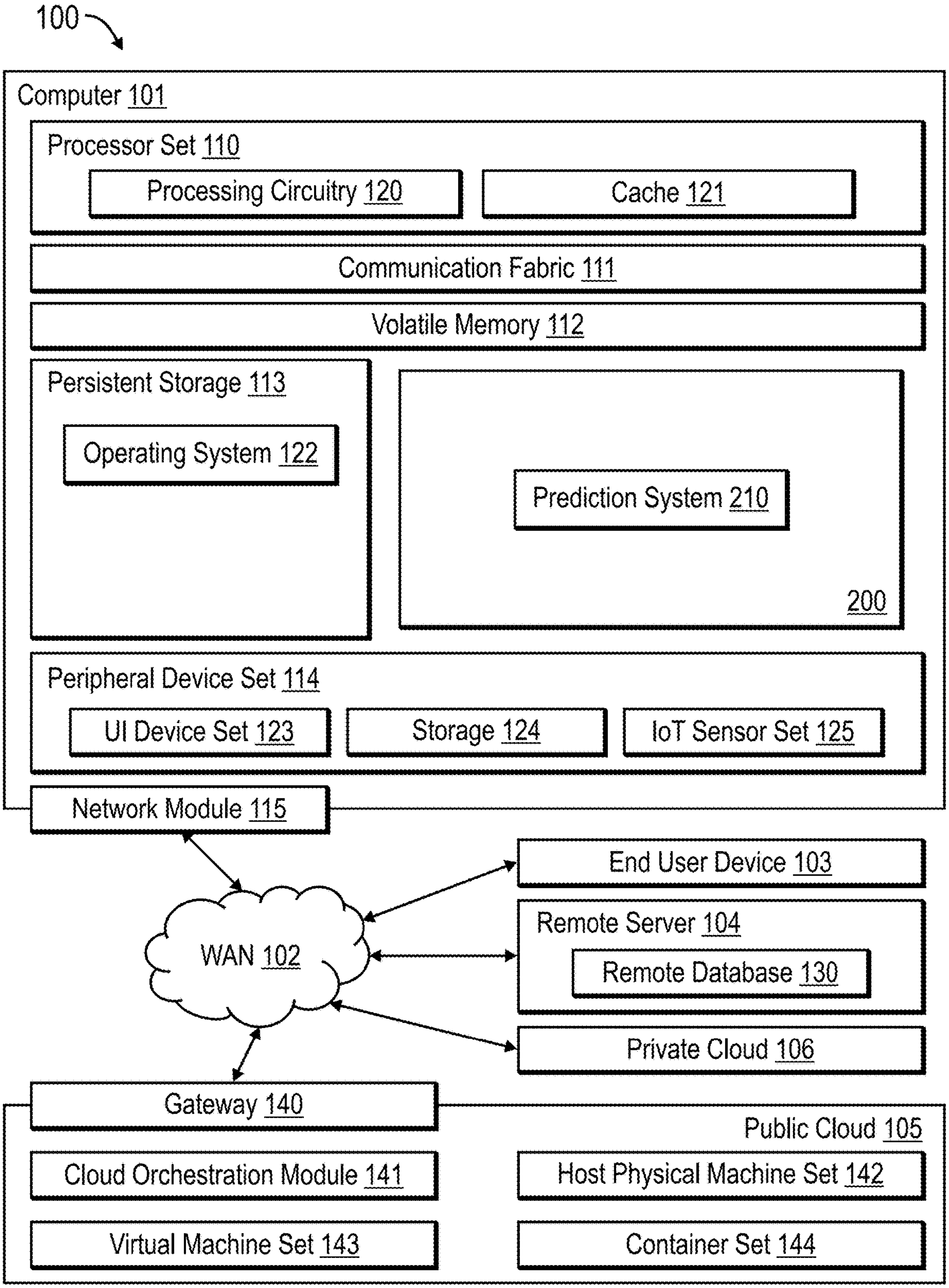
FIG. 1 illustrates a computing environment in accordance with certain embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

The description herein provides examples of embodiments of the invention, and variations and substitutions may be made in other embodiments. Several examples will now be provided to clarify various aspects of the present disclosure:

Example 1: A computer program product, the computer program product comprising a computer readable storage medium having program instructions embodied therewith, the program instructions executable by a computer processor to cause the computer processor to perform operations. The operations of the computer program product train an Artificial Intelligence (AI) predictive model. The operations of the computer program product use the AI predictive model to generate a prediction label for each item of a plurality of input items. The operations of the computer program product select a target item from the plurality of input items, wherein the target item has an initial prediction label. For a morphological segment, the operations of the computer program product identify a source item from the plurality of input items, wherein the source item shares common structural features with the target item and has a different prediction label. The operations of the computer program product generate a recombined item by: masking the morphological segment in the target item and adding the morphological segment of the source item over the masked morphological segment. The operations of the computer program product use the AI predictive model to generate a new prediction label for the recombined item. The operations of the computer program product determine that the new prediction label is different from the initial prediction label. The operations of the computer program product indicate that the recombined item is a counterfactual item, wherein the morphological segment of the source item changed the prediction label of the recombined item.

Thus, embodiments advantageously train and use an AI predictive model (i.e., a machine learning model) to efficiently generate a prediction label for each item of a plurality of input items and to generate a new prediction label for a recombined item, which enables use of the prediction labels to determine whether the recombined item is a counterfactual. In addition, embodiments advantageously identify the counterfactual item based on the morphological segment of the source item changing the prediction label of the recombined item.

Example 2: The limitations of any of Examples 1 and 3-7, wherein the operations of the computer program product train a knowledge-based segmentation model, use the knowledge-based segmentation model to identify a plurality of morphological segments in the plurality of input items, and select the morphological segment from the plurality of morphological segments. Thus, embodiments advantageously train and use the knowledge-based segmentation model (i.e., a machine learning model) to efficiently identify a plurality of morphological segments in the plurality of input items.

Example 3: The limitations of any of Examples 1-2 and 4-7, wherein the operations of the computer program product assign a feature importance score to the morphological segment of the counterfactual item. With embodiments, the feature importance score advantageously enables identification of morphological segments that were used to generate counterfactual items.

Example 4: The limitations of any of Examples 1-3 and 5-7, wherein the operations of the computer program product provide an interactive visualization with visual representations of item characteristics for a location of the morphological segment, an area of the morphological segment, a shape of the morphological segment, a color distribution of the morphological segment, and the area of the morphological segment over time. Embodiments advantageously provide visual representations of item characteristics for ease of reviewing and understanding these item characteristics.

Example 5: The limitations of any of Examples 1-4 and 6-7, wherein the interactive visualization enables adjustment of user interface elements associated with the visual representations to obtain new visual representations of the item characteristics. Embodiments advantageously enable modifying the visual representations to obtain new visual representations of the data.

Example 6: The limitations of any of Examples 1-5 and 7, wherein the operations of the computer program product create a group based on comparison of a variable of the target item and of the counterfactual item. For example, this advantageously allows for identifying a group of patients having the common variable with reference to the counterfactual item.

Example 7: The limitations of any of Examples 1-6, wherein the plurality of input items comprise images or videos. This advantageously allows images or videos to be used to identify counterfactuals.

Example 8: A computer system, comprising one or more processors, one or more computer-readable memories and one or more computer-readable, tangible storage devices and program instructions, stored on at least one of the one or more computer-readable, tangible storage devices for execution by at least one of the one or more processors via at least one of the one or more computer-readable memories, to perform a method according to any of Examples 1-7.

Example 9: A computer-implemented method according to any one of Examples 1-7.

Example 10: The limitations of Examples 1 and 2, wherein embodiments advantageously use two machine learning models: an AI predictive model to output predictive labels and a knowledge-based segmentation model to output morphological segments. A selected morphological segment is used to create a recombined image, and a new predictive label is assigned to the recombined label. In this manner the machine learning models advantageously work together in identifying counterfactual items.

Example 11: The limitations of Examples 1, 4, and 5, wherein embodiments advantageously identify the counterfactual item and provide the interactive visualization to enable better understanding of that counterfactual item.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 of FIG. 1 contains an example of an environment for the execution of at least some of the computer code involved in performing the inventive methods, such as a prediction system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set 110 may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
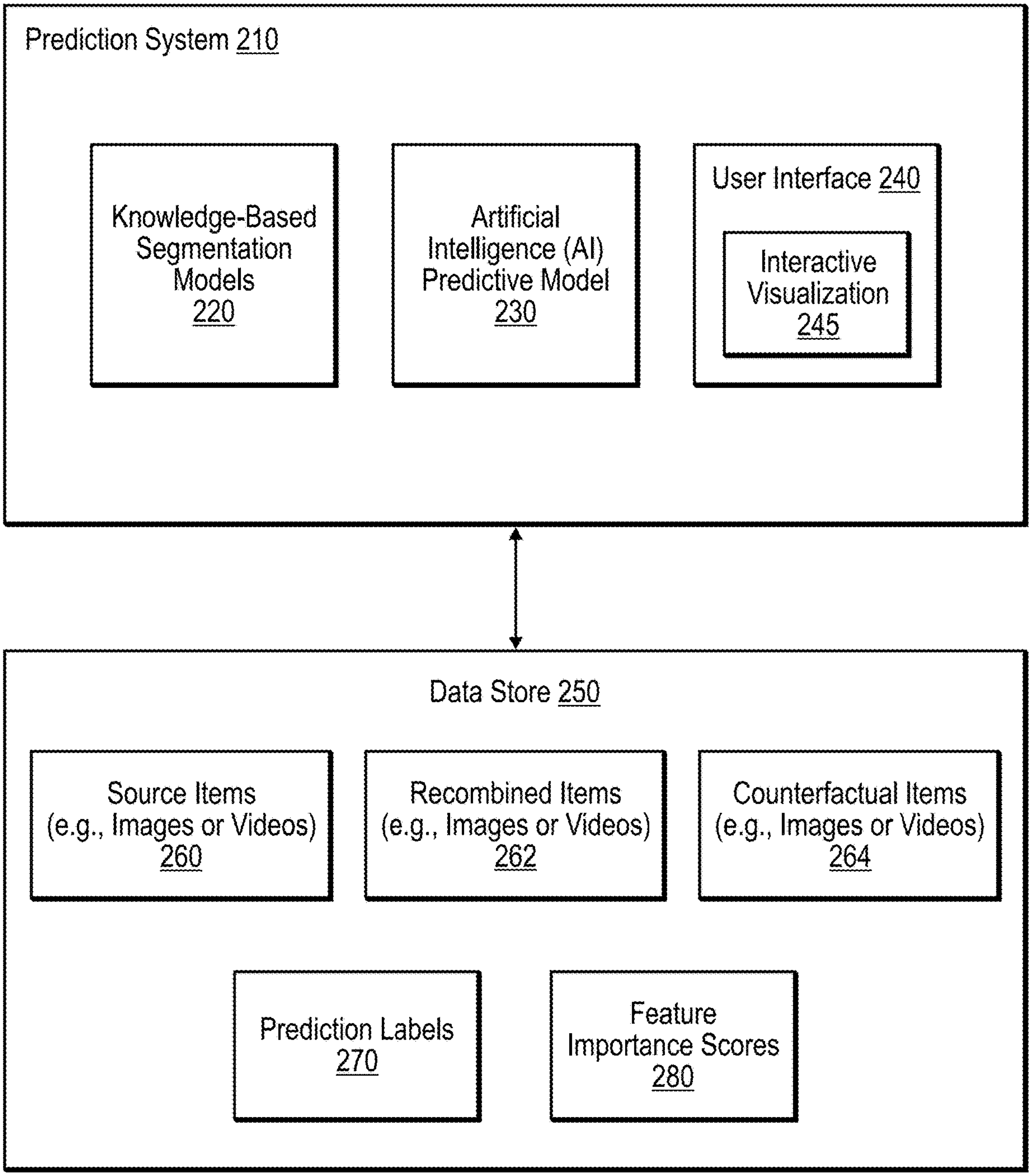
FIG. 2 illustrates a computing environment for a prediction system in accordance with certain embodiments.

FIG. 2 illustrates a computing environment for a prediction system 210 in accordance with certain embodiments. The prediction system 210 includes a knowledge-based segmentation models 220, an Artificial Intelligence (AI) model 230 (i.e., a Machine Learning (ML) model, and a user interface 240 that provides an interactive visualization 245. The prediction system 210 is connected to a data store 250. The data store 250 includes original items (e.g., images and videos) 260, recombined items (e.g., recombined images and recombined videos) 262, counterfactual items (e.g., counterfactual images and counterfactual videos) 264, prediction labels 270 (i.e., predictions), and feature importance scores (for features of morphological segments). An item may be a media item, such as an image or a video. In certain embodiments, each knowledge-based segmentation model 220 may process different types of items (e.g., one knowledge-based segmentation model 220 processes chest x-rays, while another knowledge-based segmentation model 220 processes leg x-rays). In addition, different knowledge-based segmentation models 220 may identify different morphological segments in the same item (e.g., one knowledge-based segmentation model 220 may identify heart structures in a chest x-ray, while another knowledge-based segmentation model 220 may identify bone structures in the same chest x-ray).

A recombined item (image or video) may be described as an original item (image or video) with a morphological segment replaced with another morphological segment. A counterfactual item (image or video) may be described as a recombined item (image or video) for an original item (image or video) having a different prediction label from the original item (image or video). Also, a video may be described as a series of images.

In certain embodiments, the prediction system 210 provides an interactive counterfactual explanation for medical image/video-based predictive models via masking and mixing.

In certain embodiments, the prediction system 210 provides a counterfactual AI technique that sheds light on "what if" scenarios, enabling researchers to understand not only why a certain diagnosis was made, but also how altering particular areas of items may result in an alternative outcome predicted by the AI predictive model 230. With embodiments, the AI predictive model 230 may be referred to as an explainable AI predictive model 230 that explains AI predictive model 230 prediction labels using counterfactual items generated by recombining medically relevant morphological segments in patient imaging. Morphological segments may also be referred to as "physiological segments" or "segmented morphological features".

In certain embodiments, the prediction system 210 recognizes hidden patterns from a large dataset of items (e.g., millions of medical images or medical videos) to predict patients' health outcomes. The prediction system 210 generates prediction labels ("conclusions") from the extracted patterns and explains how the AI predictive model 230 came to the prediction labels. The AI predictive model 230 is based on attributes and is used by the prediction system 210 to provide explanation by showing areas of given items that the AI predictive model 230 attends to the most to identify what parts of the item led to a particular prediction. In addition, the prediction system 210 explains the relative importance of different morphological segments, as well as, how the structural and functional patterns (e.g., color and shape of morphological segments) captured in medical items influence prediction labels.

In certain embodiments, prediction system 210 identifies the influence of morphological segments on AI predictive model 230 predictions of medical items by identifying counterfactual items from recombined items. In particular, not all morphological segments of an image/video contribute equally to model predictions, so the prediction system 210 identifies the morphological segments with greater "influence" (i.e., the morphological segments that affect model predictions more than other morphological segments). In particular, the influence of a morphological segment is determined to be greater if the feature importance score of that morphological segment is higher (e.g., relative to the importance threshold or relative to the feature importance score of other morphological segments). In certain embodiments, the feature importance score may also be referred to as a segment importance score.

The prediction system 210 segments key areas of items and provides a summary of item characteristics of: the location, area, shape, color, and area over time (if the item is a video) of each key morphological segment.

In certain embodiments, the prediction system 210 outputs new recombined, counterfactual items, prediction labels for the recombined items, an influence of key morphological segments for model prediction, and an interactive visualization summarizing five item characteristics (i.e., location, area, shape, color distribution, area over time) extracted from the recombined items.

Figure 3:
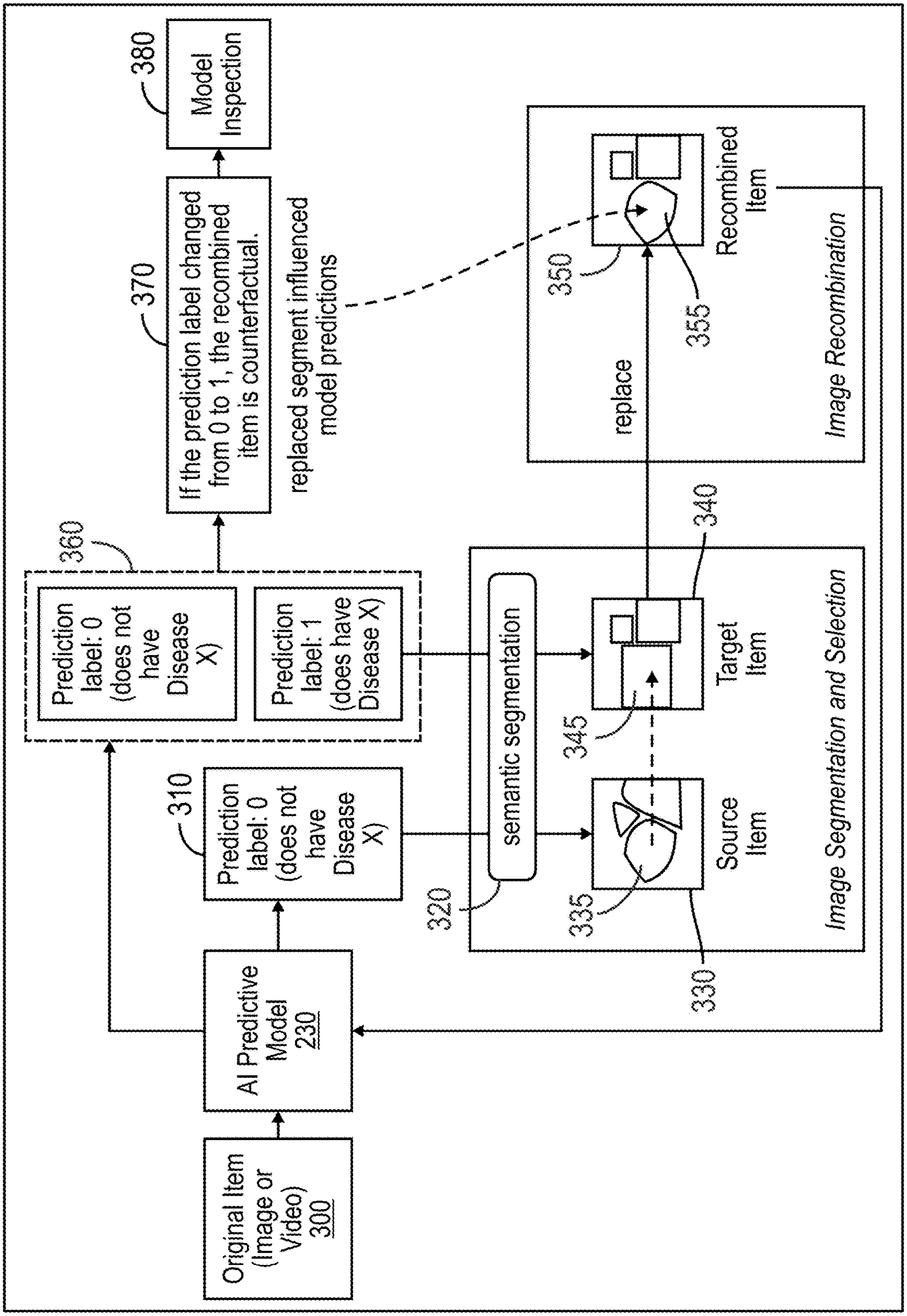
FIG. 3 illustrates a high-level flow of processing in accordance with certain embodiments.

FIG. 3 illustrates a high-level flow of processing in accordance with certain embodiments. An original item (image or video) 300 is input to a pre-trained AI predictive model 230, and the AI predictive model 230 outputs a prediction label of 0 (which indicates that a user does not have disease X). Then, the prediction system 210 uses semantic segmentation (block 320) to identify domain-relevant morphological segments in each item in an item set. The prediction system 210 identifies a source morphological segment 335 of a source item 330 that is to replace a target morphological segment 345 of the target item 340 (which is the original item 300 in this example). Then, the prediction system 210 replaces the target morphological segment 345 with the source morphological segment 335 to form a recombined item 350 having a replaced morphological segment 355. Then, the prediction system 210 inputs the recombined item 350 into the AI predictive model 230 which generates an output 360. For the recombined item 350, the output 360 may be the prediction label of 0 or the prediction label of 1 (which indicates that the user does have disease X). If the AI predictive model 230 predicts that the recombined item 350 has a different label from the original item 300, this recombined item 350 is a counterfactual (block 370), and the prediction system 210 concludes that the replaced morphological segment 355 changed the prediction of the AI predictive model 230 and issues a model inspection (block 380) (i.e., indicates that changing the target morphological segment changed the prediction label from 0 to 1).

Figure 4A:
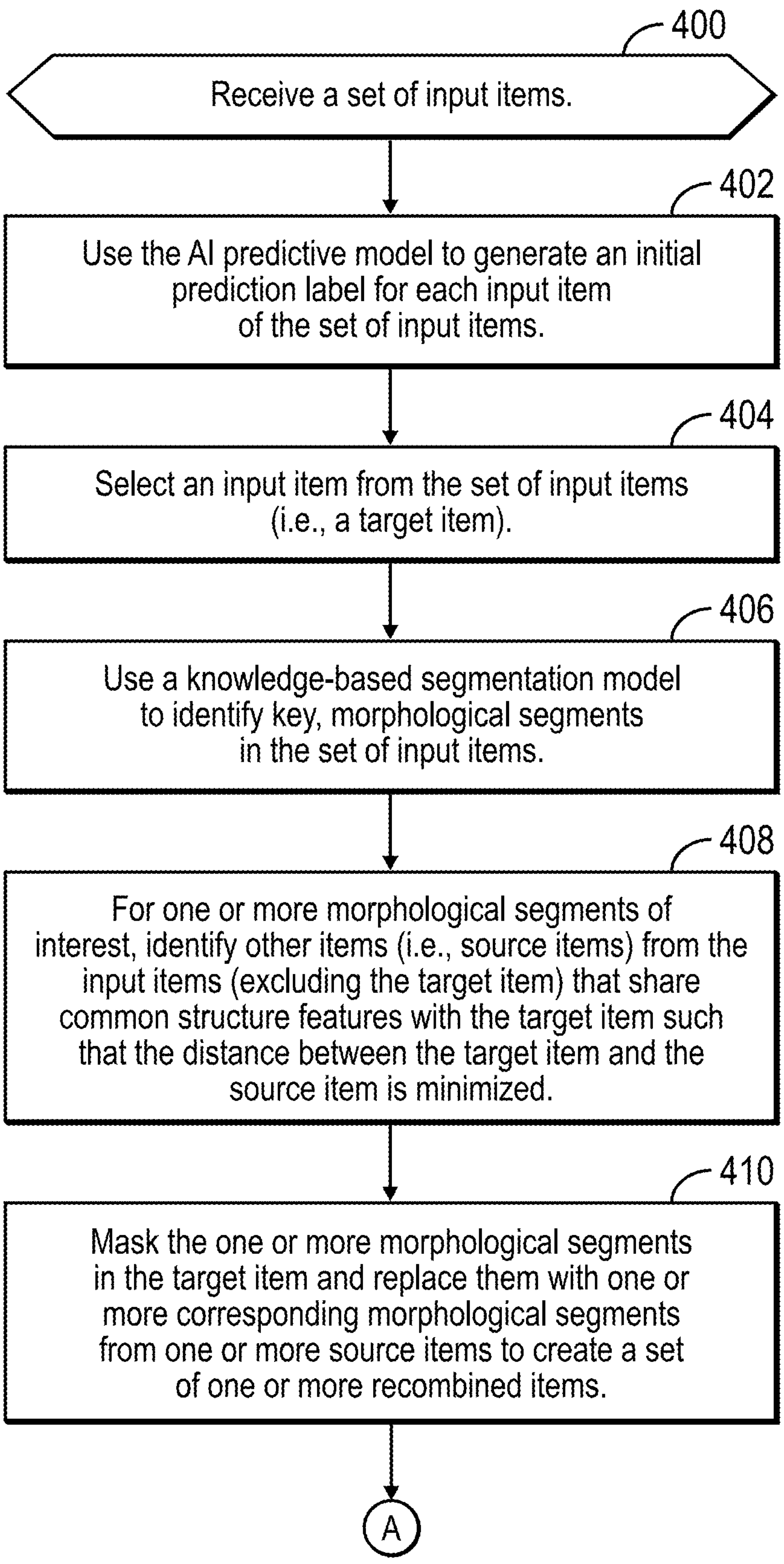
FIGS. 4A and 4B illustrate, in a flowchart, operations for explaining AI predictive model outputs (prediction labels) in accordance with certain embodiments.
Figure 4B:
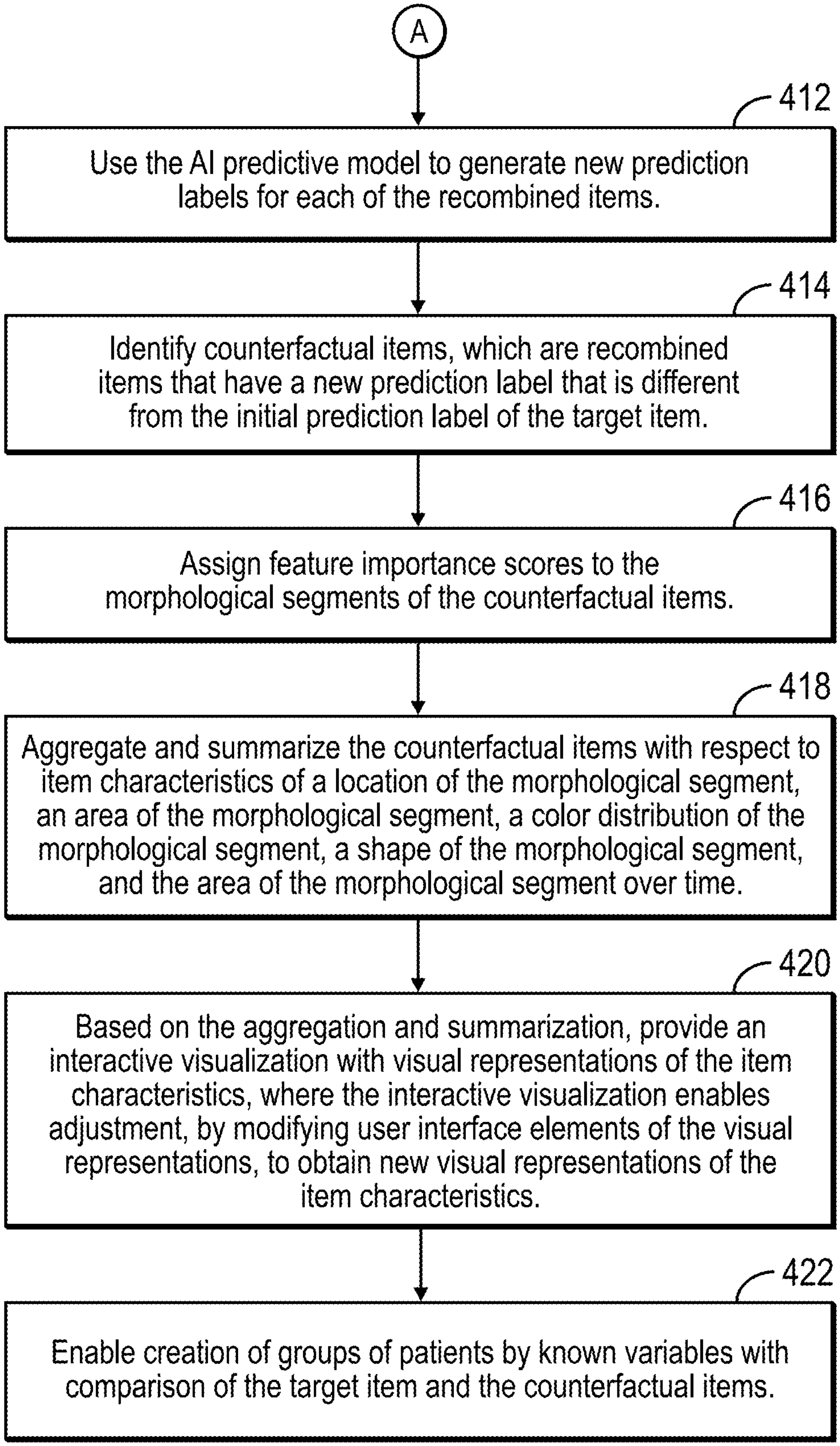

FIGS. 4A and 4B illustrate, in a flowchart, operations for explaining AI predictive model outputs (prediction labels) in accordance with certain embodiments. The prediction system 210 uses a pre-trained AI predictive model 230 to output prediction labels (i.e., to predict outcomes) based on medical items and explains the prediction labels for a given set of input items (e.g., by identifying morphological segments in an input item (Itarget) caused the AI predictive model 230 to make prediction (p) instead of an alternate prediction (p')?).

Control begins at block 400 with the prediction system 210 receiving a set of input items (Iall). In certain embodiments, the input items are medical images and/or medical videos. In block 402, the prediction system 210 uses the AI predictive model 230 to generate an initial prediction label for each input item of the set of input items.

In block 404, the prediction system 210 selects an input item (i.e., a target item). In certain embodiments, the prediction system 210 selects the target item based on various factors (e.g., co-morbidities, image/video characteristics, etc.). In certain other embodiments, the prediction system 210 receives selection the target item from a user. For example, the user may select a particular target item with prediction (p) to receive an explanation of that prediction (p). For the selected target item, the prediction system 210 generates new items (counterfactuals) that may result in a different prediction label (p') by minimally perturbing the target item.

In block 406, the prediction system 210 uses a knowledge-based segmentation model 220 to identify key, morphological segments in the set of input items. In certain embodiments, the key, morphological segments are ones that have been pre-identified (e.g., by an expert in the medical field) and are used to train the knowledge-based segmentation model 220. Then, the trained knowledge-based segmentation model 220 tries to identify these morphological segments in the set of input items.

In certain embodiments, the prediction system 210 selects the knowledge-based segmentation model 220 from a plurality of knowledge-based segmentation models based on the type of item (e.g., chest x-rays versus leg x-rays) or based on the morphological segment (e.g., left ventricle of the heart).

In block 408, for one or more morphological segments of interest, the prediction system 210 identifies other items (i.e., source items) from the input items (excluding the target item) that share common structural features with the target item such that the distance between the target item and the source item is minimized.

In certain embodiments, the source item and target item share common structural features when they have similar morphological segments of interest. For example, cardiac Magnetic Resonance Imaging (MRI) images have the same three heart features (right ventricle cavity, left ventricle cavity, left ventricle myocardium). As another example, for tumor detection, the prediction system 210 assumes that both the source item and the target item have a tumor feature. In certain embodiments, these structural features are used to generate morphological segments.

In certain embodiments, minimum distance indicates similarity and may be defined in different ways, based on usage scenario. For example, minimum distance may be determined based on similarity in patient information (e.g., both source and target items come from patients with the same co-morbidities), similarity based on image/video similarity (e.g., both source and target items have similar cardiac volume or similar myocardium thickness, similar image size/resolution etc.), etc.

In certain embodiments, the prediction system 210 selects the one or more morphological segments of interest based on various factors (e.g., co-morbidities, image/video characteristics, etc.). In certain other embodiments, the prediction system 210 receives selection of the one or more morphological segments of interest from a user.

That is, with embodiments, from the set of input items (Iall), the prediction system 210 filters for source items (Isource) that have a different prediction from the target item (Itarget). In certain embodiments, the prediction system 210 selects or receives selection (e.g., by a user) of a set of source items that have the different prediction label (e.g., the target item has a prediction label of "has disease", and the source items selected have the prediction label of "does not have disease").

In block 410, the prediction system 210 masks one or more morphological segments in the target item and replaces these one or more masked, morphological segments with one or more corresponding morphological segments from each source item in the source items to create a set of one or more recombined items (Irecombined). That is, the target item is modified with the one or more morphological segments of a first source item to create a first recombined item, the target item is modified with the one or more morphological segments of a second source item to create a second recombined item, etc.

In certain embodiments, an image (or single video frame) is typically an array or matrix of pixels. To perform masking, the prediction system 210 zeros-out the pixels that are to be masked (i.e., replacing pixel information with 0).

From block 410 (FIG. 4A), processing continues to block 412 (FIG. 4B).

In block 412, the prediction system 210 uses the AI predictive model 230 to generate new prediction labels for each of the recombined items (Irecombined).

In block 414, the prediction system 210 identifies counterfactual items, which are recombined items that have a new prediction label that is different from the initial prediction label of the target item. For example, if a recombined item has a prediction label p' that is different from the initial prediction label p of the selected item, then the recombined item is a counterfactual item of the selected item.

In certain embodiments, since the recombined item is generated by replacing key morphological segments in the selected item, the recombined item and the target item are identical except for the replaced one or more morphological segments. Therefore, the prediction system 210 determines that the replaced one or more morphological segments caused the change in model prediction labels, thus, providing a domain relevant explanation of the item's morphological segments used by AI predictive model 230 to generate prediction labels.

In certain embodiments, the processing of blocks 404-414 is performed for each of multiple items to generate a large set of recombined items that are processed to identify counterfactual items.

In block 416, the prediction system 210 assigns feature importance scores to the morphological segments of the counterfactual items.

In block 418, the prediction system 210 aggregates and summarizes the counterfactual items with respect to the following item characteristics:

Location of morphological segment
Area of morphological segment
Shape of morphological segment
Color distribution of morphological segment
Area of morphological segment over time In certain embodiments, the prediction system 210 aggregates and summarizes the counterfactual items to identify the influence of the morphological segments on the prediction labels with respect to the item characteristics.

In block 420, based on the aggregation and summarization (of block 418), the prediction system 210 provides an interactive visualization 245 (via the user interface 240) with visual representations of the item characteristics, where the interactive visualization enables adjustment, by modifying user interface elements of the visual representations, to obtain new visual representations of the item characteristics.

In certain embodiments, the prediction system 210 visualizes these item characteristics using visual representations. The visual representations may be: a heat map, a bar graph, a line chart, and/or radial contour summaries of the information. The visual representations include user interface elements (e.g., controls). In certain embodiments, the interactive visualization enables adjustment by allowing a user to modify the user interface elements of: the heat map, the bar graph, the line chart and/or the radial contour summaries to obtain new visual representations (i.e., new views or new visualizations) of the item characteristics.

In block 422, the prediction system 210 enables creation (i.e., interactive stratification) of groups of patients by known variables (e.g., co-morbidities) with comparison of the selected input item and the counterfactual items. In certain embodiments, the prediction system 210 enables a user to interactively stratify groups of patients by known variables to compare and contrast imaging patterns between user-defined groups.

Figure 5:
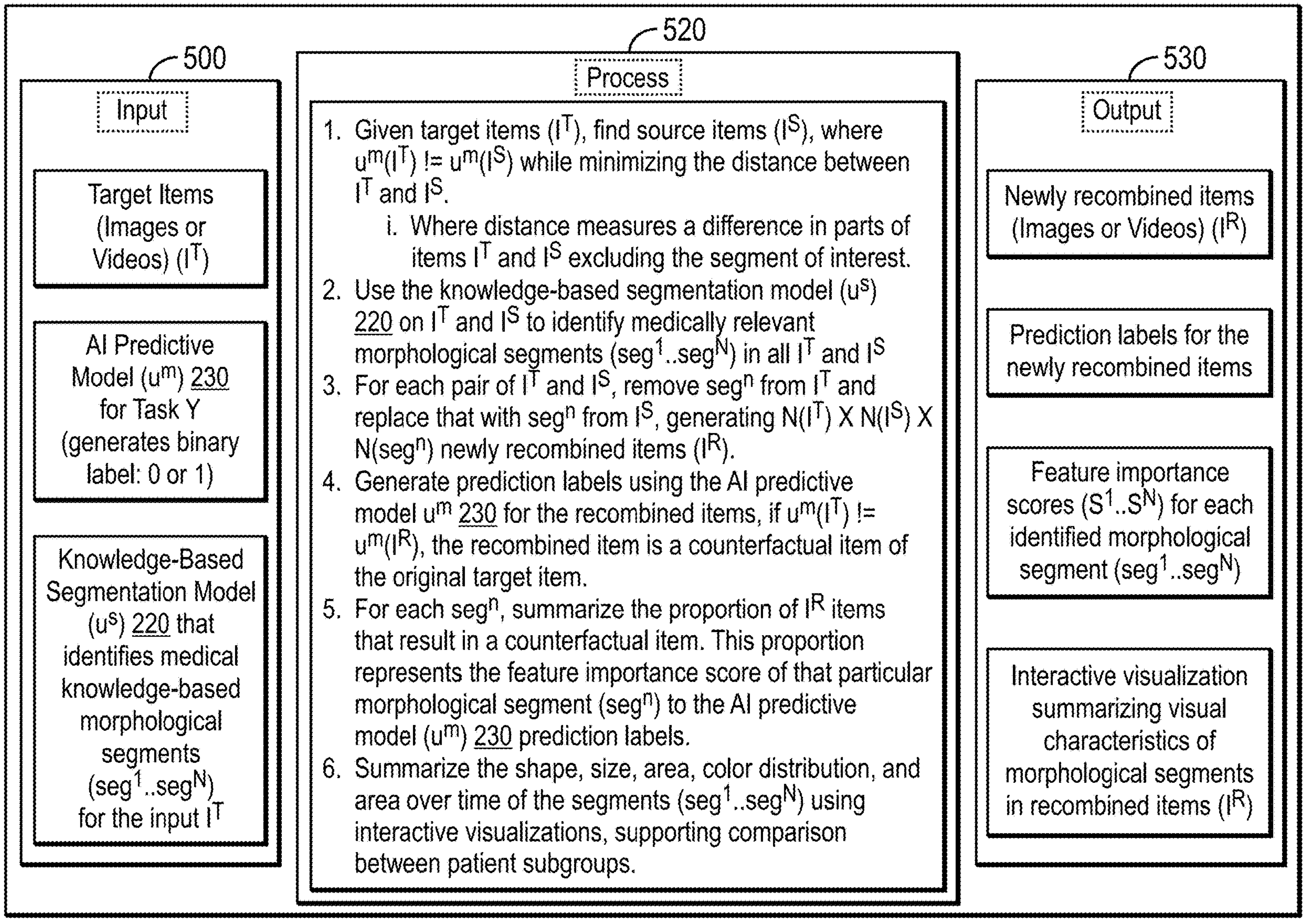
FIG. 5 illustrates inputs, processing, and outputs of the prediction system in accordance with certain embodiments.

FIG. 5 illustrates inputs, processing, and outputs of the prediction system 210 in accordance with certain embodiments. The prediction system 210 receives input 500 of target items, the AI predictive model 230, and the knowledge-based segmentation model 220 and performs processing 500 to generate output 550 of newly recombined items, prediction labels for the newly recombined items, feature importance scores for morphological segments, and an interactive visualization. In certain embodiments, the prediction system 210 identifies the proportion of counterfactual images that have an alternative prediction label with reference to the prediction label of the target image, and this proportion is the feature importance score for each of the morphological segments.

In certain embodiments, the likelihood of a morphological segment generating a counterfactual result may be interpreted as the morphological segment having a high feature importance score. The feature importance score indicates that the morphological segment influenced model predictions to a greater extent. A high feature importance score indicates that the predictive model has learned that a particular morphological segment is a strong indicator of the prediction label (i.e., the outcome of interest or whatever is being predicted). A feature importance score may be considered "high" if it exceeds an importance threshold.

Figure 6:
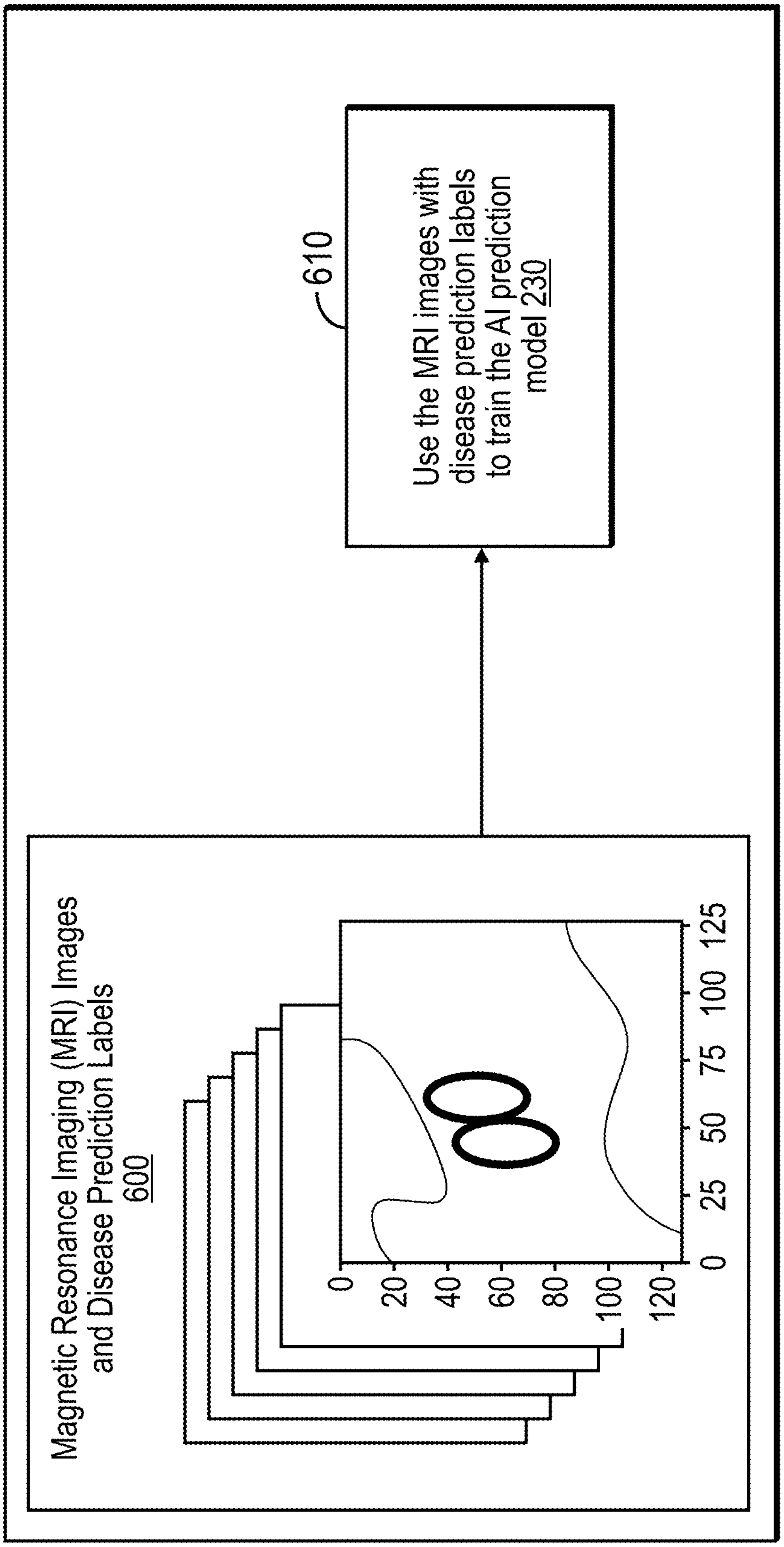
FIG. 6 illustrates training of the AI predictive model in accordance with certain embodiments.

FIG. 6 illustrates training of the AI predictive model 230 in accordance with certain embodiments. In certain embodiments, the AI predictive model 230 is trained with medical items (i.e., medical imaging), such as MRI images, and disease prediction labels 600. The images may be patient images (e.g., cardiac MRIs) for a database. Each of the images is associated with a disease label. The disease label indicates patient disease outcomes (e.g. whether the patient has hypertension). These disease outcomes are the labels for supervised AI predictive model 230 training. The trained AI predictive model 230 is able to receive new patient cardiac MRI images as input, and then the trained AI predictive model 230 output a prediction label for patient disease outcomes. The AI predictive model 320 may be re-trained based on feedback (e.g., from an expert or other user) on the predictive labels.

Figure 7:
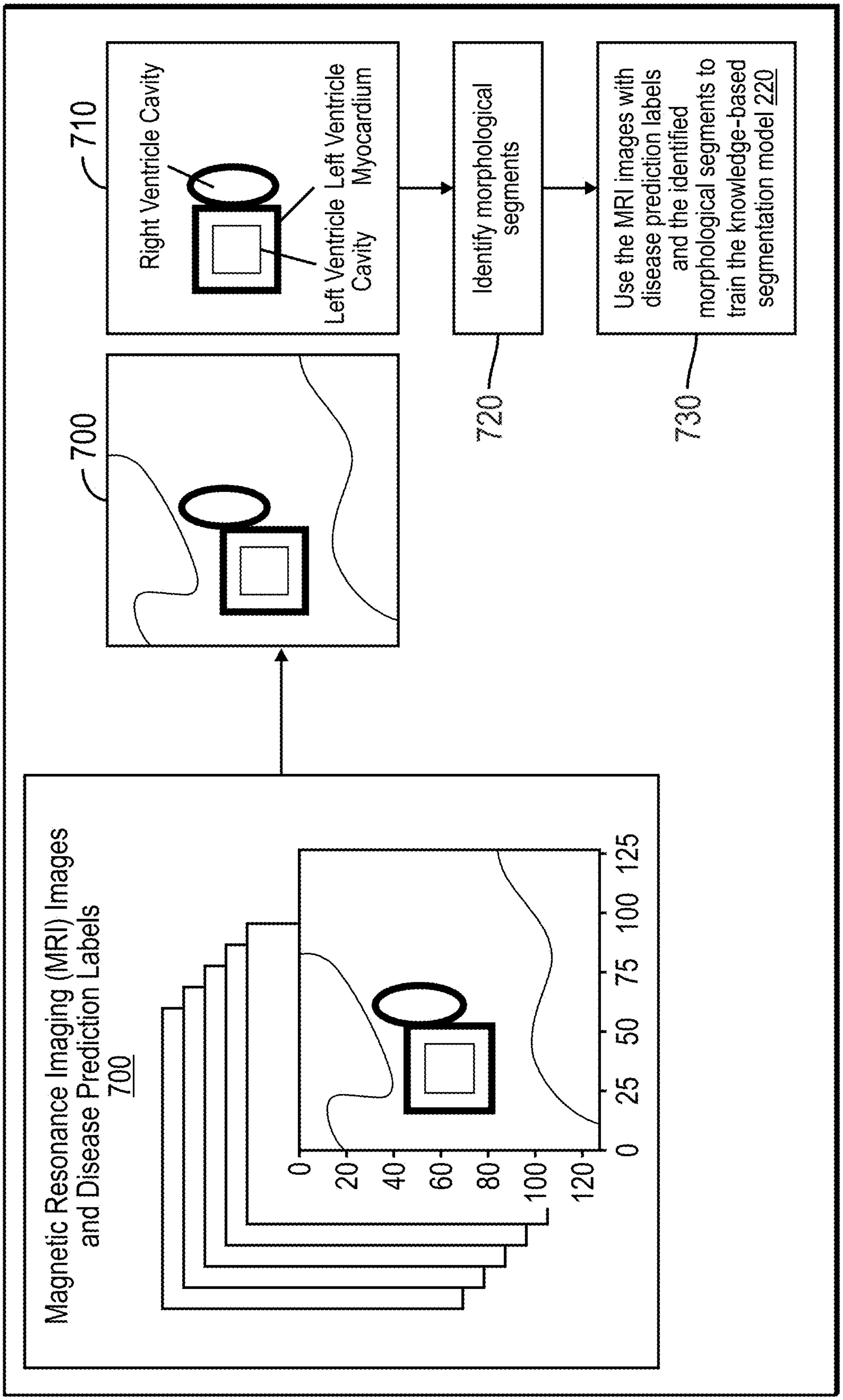
FIG. 7 illustrates training of the knowledge-based segmentation model in accordance with certain embodiments.

FIG. 7 illustrates training of the knowledge-based segmentation model 220 in accordance with certain embodiments. In certain embodiments, the knowledge-based segmentation model 220 is trained with medical items (i.e., medical imaging), such as MRI images, and disease prediction labels 700. The images may be patient images (e.g., cardiac MRIs) for a database. Each of the images is associated with a disease label. The disease label indicates patient disease outcomes (e.g. whether the patient has hypertension). In certain embodiments, for each MRI image, an expert may initially identify key morphological segments (e.g. right ventricle cavity, left ventricle cavity, left ventricle myocardium, etc.) (block 720). The MRI images with disease outcomes and the key morphological segments are used for training the knowledge-based segmentation model 220 (block 730). The trained knowledge-based segmentation model 220 is able to receive new medical items (e.g., patient cardiac MRI images) as input identify key morphological segments in these new medical items. The knowledge-based segmentation model 220 may be re-trained based on feedback (e.g., from an expert or other user) on the morphological segments. In certain embodiments, the knowledge-based segmentation model 220 is a Recurrent Neural Network (RNN).

Figure 8:
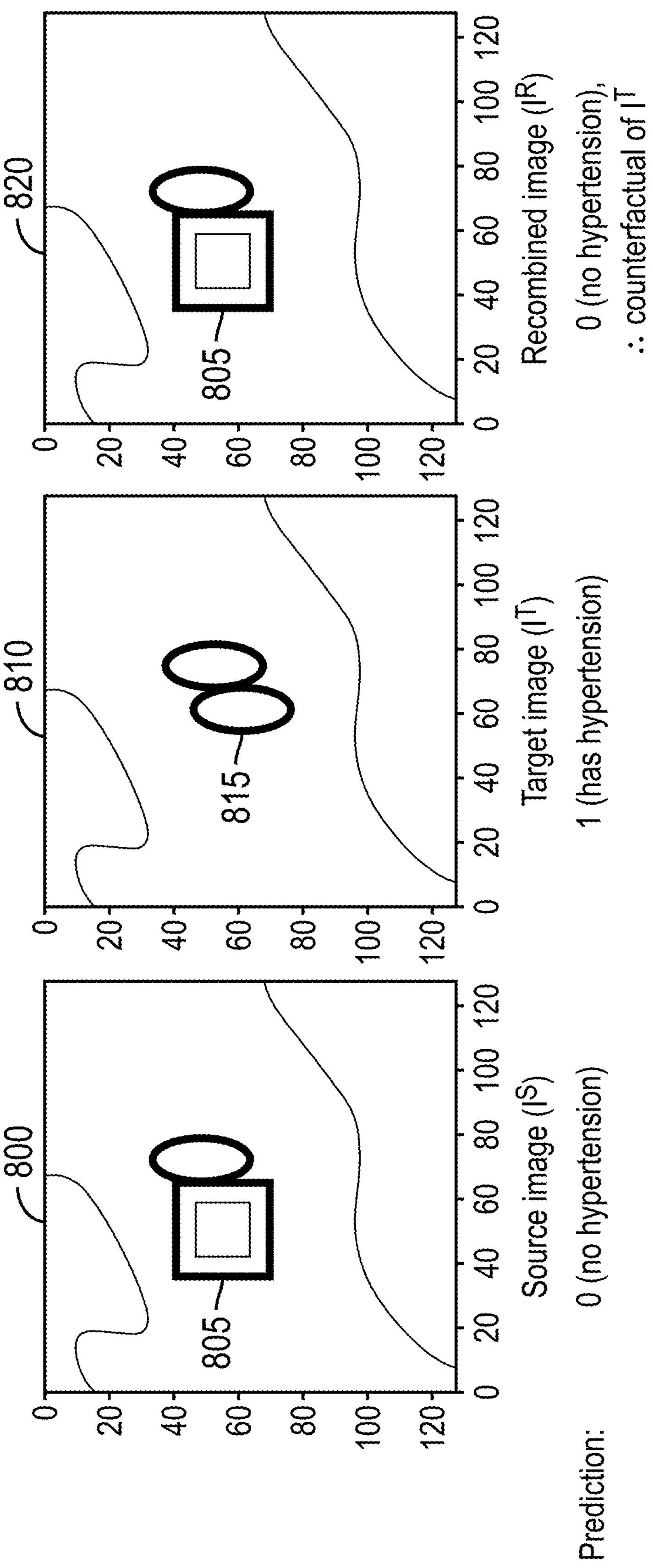
FIG. 8 illustrates recombining morphological segments for counterfactual image generation in accordance with certain embodiments.

FIG. 8 illustrates recombining morphological segments for counterfactual image generation in accordance with certain embodiments. A source image 800 has a morphological segment 805 and a prediction label of 0: no hypertension. A target image 810 has a morphological segment 815 and a prediction label of 1: hypertension. The prediction system 210 generates a recombined image 820. In the recombined image 820, the morphological segment 815 is masked and replaced with the morphological segment 805 and has a prediction label of 0, which makes this a counterfactual image. With the morphological mixing, distance is preserved in that the source image 800 and the target image 810 are similar other than the segment to be replaced in the recombined image 820, but have different prediction labels. Then, the prediction system 210 generates a new predication label for the recombined image 820.

Figure 9A:
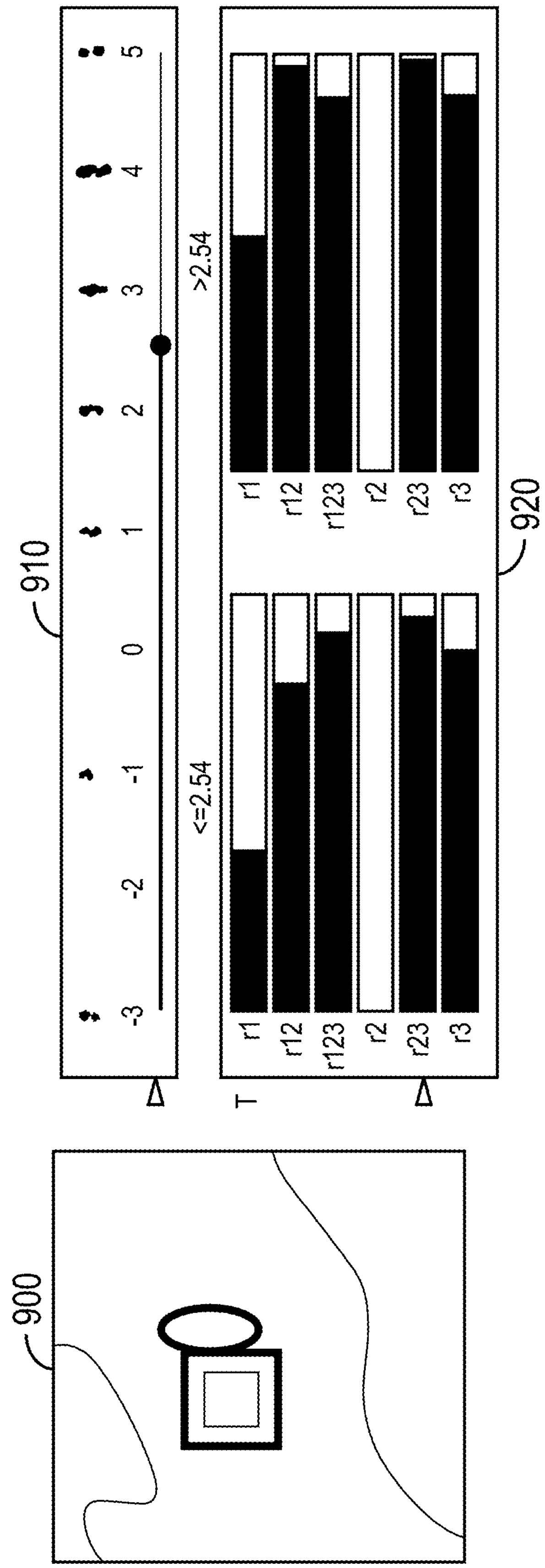
FIGS. 9A and 9B illustrate an example of visualizing segment importance and summarizing characteristics in accordance with certain embodiments.
Figure 9B:
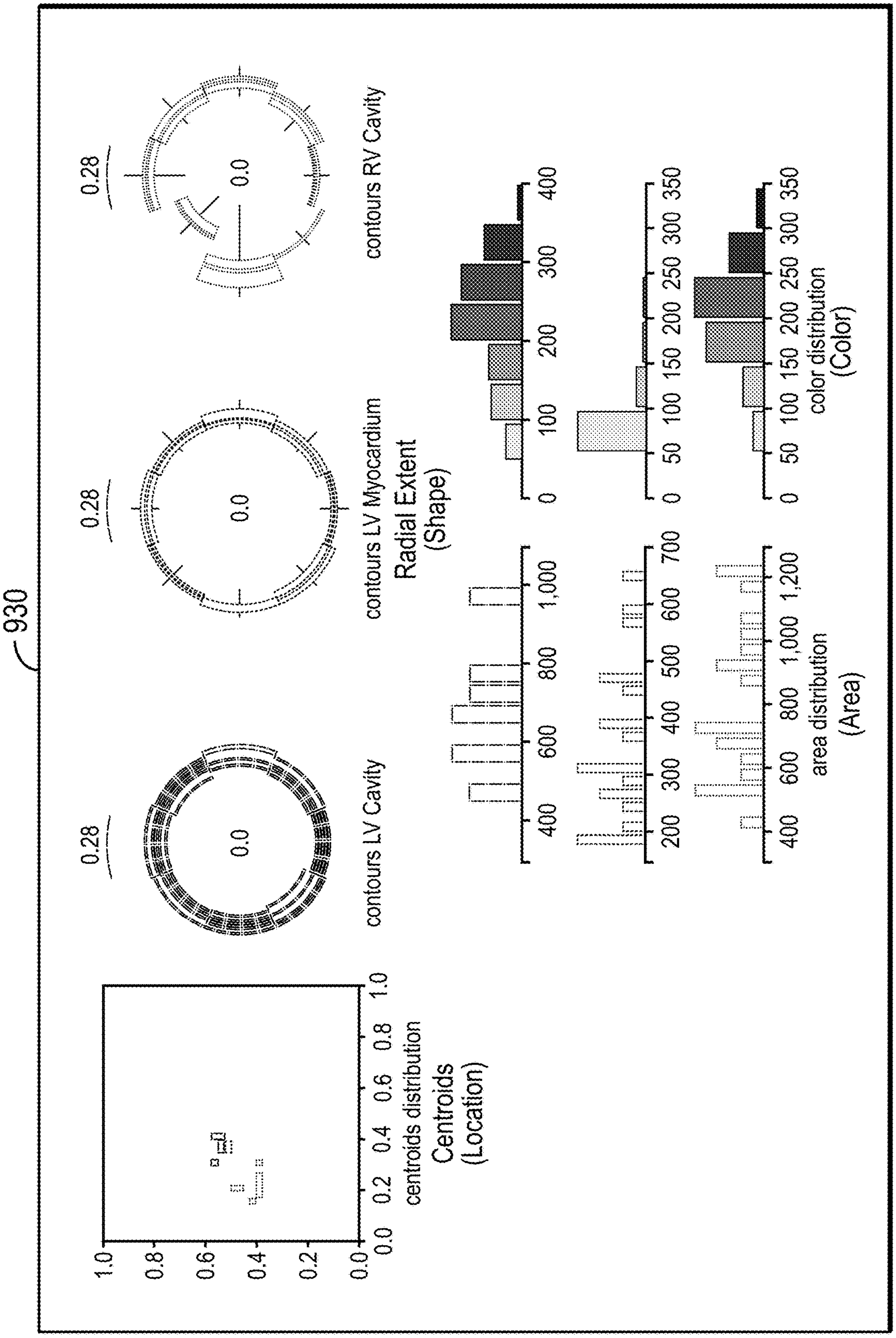

FIGS. 9A and 9B illustrate an example of visualizing segment importance and summarizing characteristics in accordance with certain embodiments. In FIG. 9A, the image 900 illustrates a single cardiac MRI segmented to identify different parts of the human heart.

In certain embodiments, the prediction system 210 creates subsets 910 based on selected source or target image factors (e.g., date when the image was generated, etc.). The prediction systems displays an interactive visualization 920 showing a distribution of the factors and the change subgroup threshold. This allows for comparison of counterfactual proportions between subgroups.

For example, the influence of each morphological segment (R1: Left Ventricle Cavity, R2: Left Ventricle Myocardium, R3: Right Ventricle Cavity) on AI predictive model 230 predictions is summarized visually. A greater counterfactual proportion implies a greater influence of the morphological segment on AI predictive model 230 predictions because replacing that morphological segment is more likely to change the AI predictive model 230 predictions. In addition, users (e.g., model developers) may also create subgroups to compare patients.

In FIG. 9B, the interactive visualization 930 illustrates visual characteristics of morphological segments of multiple cardiac MRIs that have been aggregated and summarized.

Figure 10:
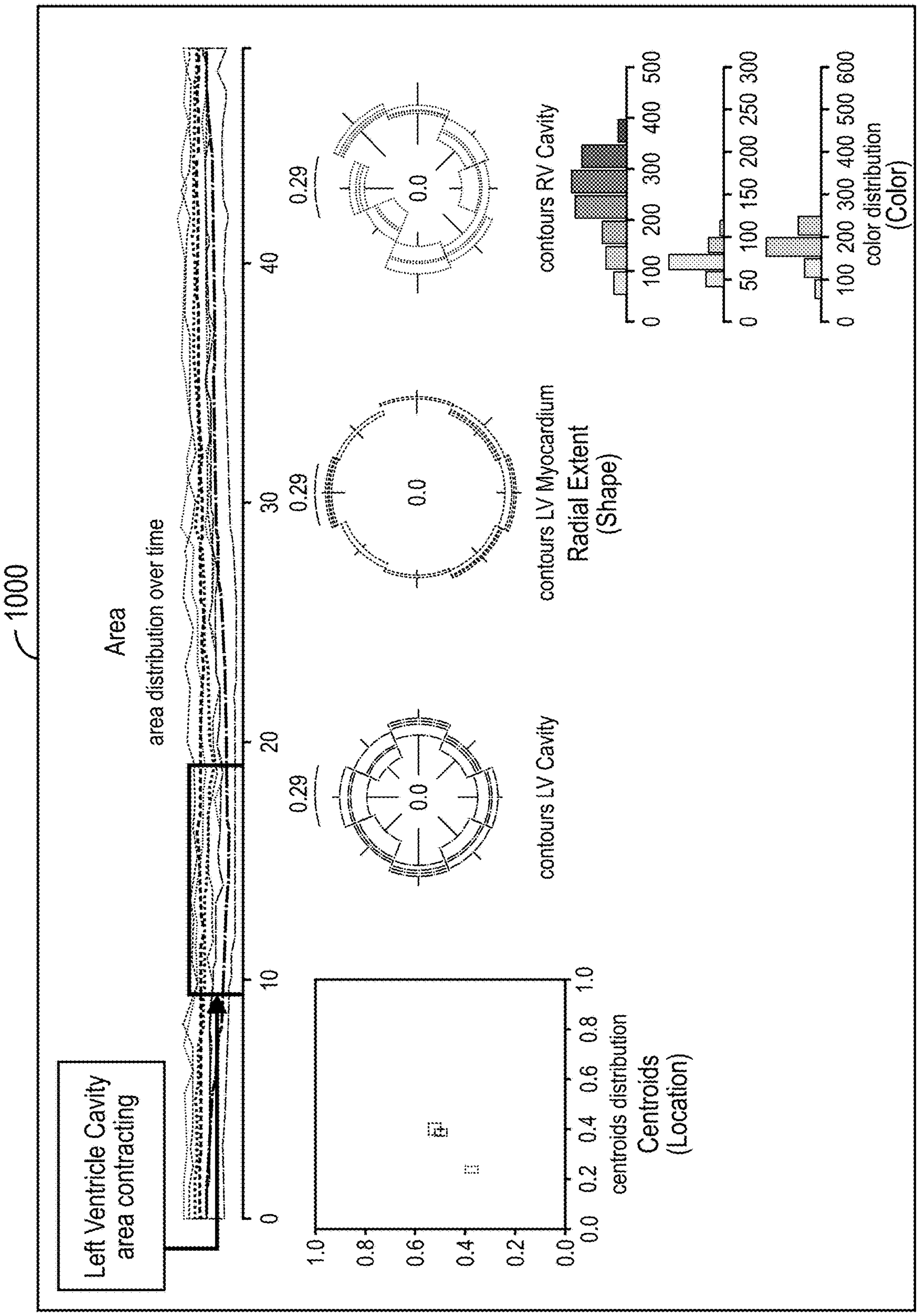
FIG. 10 illustrate another example of visualizing segment importance and summarizing characteristics in accordance with certain embodiments.

FIG. 10 illustrate another example of visualizing segment importance and summarizing characteristics in accordance with certain embodiments. In FIG. 10, the interactive visualization 1000 includes a different type of visualization for area than in FIG. 9B. In certain embodiments, if the inputs are videos and not images, the prediction system 210 summarizes the visual characteristics of morphological segments using similar visualizations for images, with the exception that area is now visualized over time.

Figure 11:
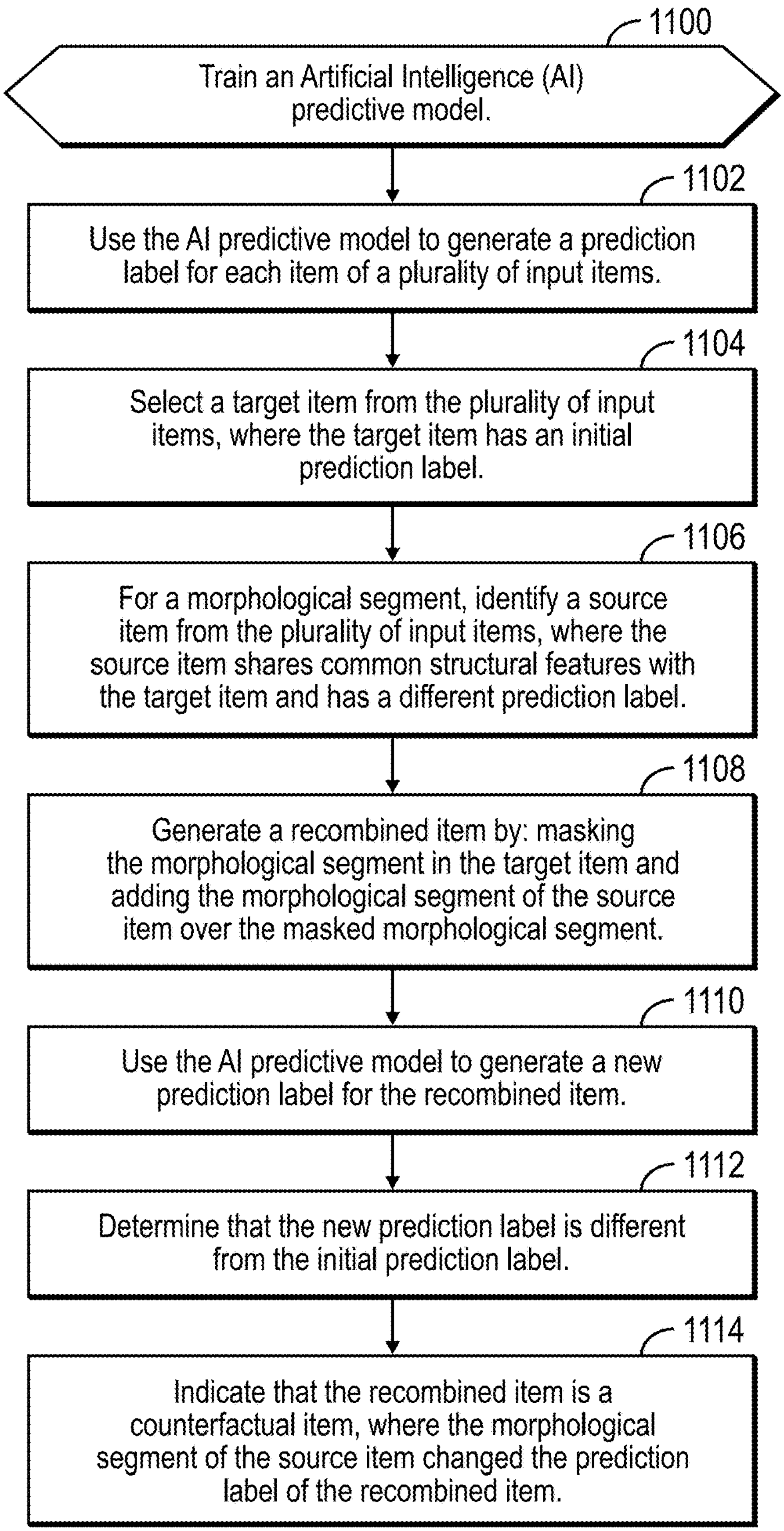
FIG. 11 illustrates, in a flowchart, operations for training and using machine learning models to provide counterfactual explanations of predictions in accordance with certain embodiments.

FIG. 11 illustrates, in a flowchart, operations for training and using machine learning models to provide counterfactual explanations of predictions in accordance with certain embodiments. Control begins at block 1100 with the prediction system 210 training an Artificial Intelligence (AI) predictive model. In block 1102, the prediction system 210 uses the AI predictive model to generate a prediction label for each item of a plurality of input items. In block 1104, the prediction system 210 selects a target item from the plurality of input items, where the target item has an initial prediction label (i.e., a "first" prediction label). In block 1106, the prediction system 210, for a morphological segment, identifies a source item from the plurality of input items, where the source item shares common structural features with the target item and has a different prediction label (i.e., a "second" prediction label). generates a recombined item by: masking the morphological segment in the target item and adding the morphological segment of the source item over the masked morphological segment. That is, the masked portion is replaced with the morphological segment of the source item.

In block 1110, the prediction system 210 uses the AI predictive model to generate a new prediction label (i.e., a "third" prediction label) for the recombined item. In block 1112, the prediction system 210 determines that the new prediction label is different from the initial prediction label. In block 1114, the prediction system 210 indicates that the recombined item is a counterfactual item, where the morphological segment of the source item changed the prediction label of the recombined item.

In certain embodiments, the prediction system 210 provides explanations for black-box AI predictive model predictions by using a counterfactual AI predictive model 230 on medical images or videos that combines medical knowledge (i.e., using the knowledge-based segmentation model 220) with selected images or videos.

In certain embodiments, the prediction system 210 generates new images or videos by masking and mixing and provides predictions and explanations using an interactive visualization so that users may understand the influence of the segmented areas on the AI predictive model 230 prediction.

In certain embodiments, the prediction system 210 explains a prediction of an AI predictive model 230 made with respect to medical images. The prediction system 210 receives a plurality of target images. The prediction system 210 labels, by a knowledge-based segmentation model 220, structural features (i.e., morphological segments) of human bodies within the target images. The prediction system 210 identifies one or more source images that share the most common of the labeled structural features of the target images. The prediction system 210 masks the structural features in the target images. The prediction system 210 mixes the structural features of the source images into the masked structural features of the target images to produce one or more fused images. The prediction system 210 generates a prediction for the fused images using a pre-trained AP predictive model 230. The prediction system 210 summarizes an influence of the structural features on the generated prediction.

Figure 12:
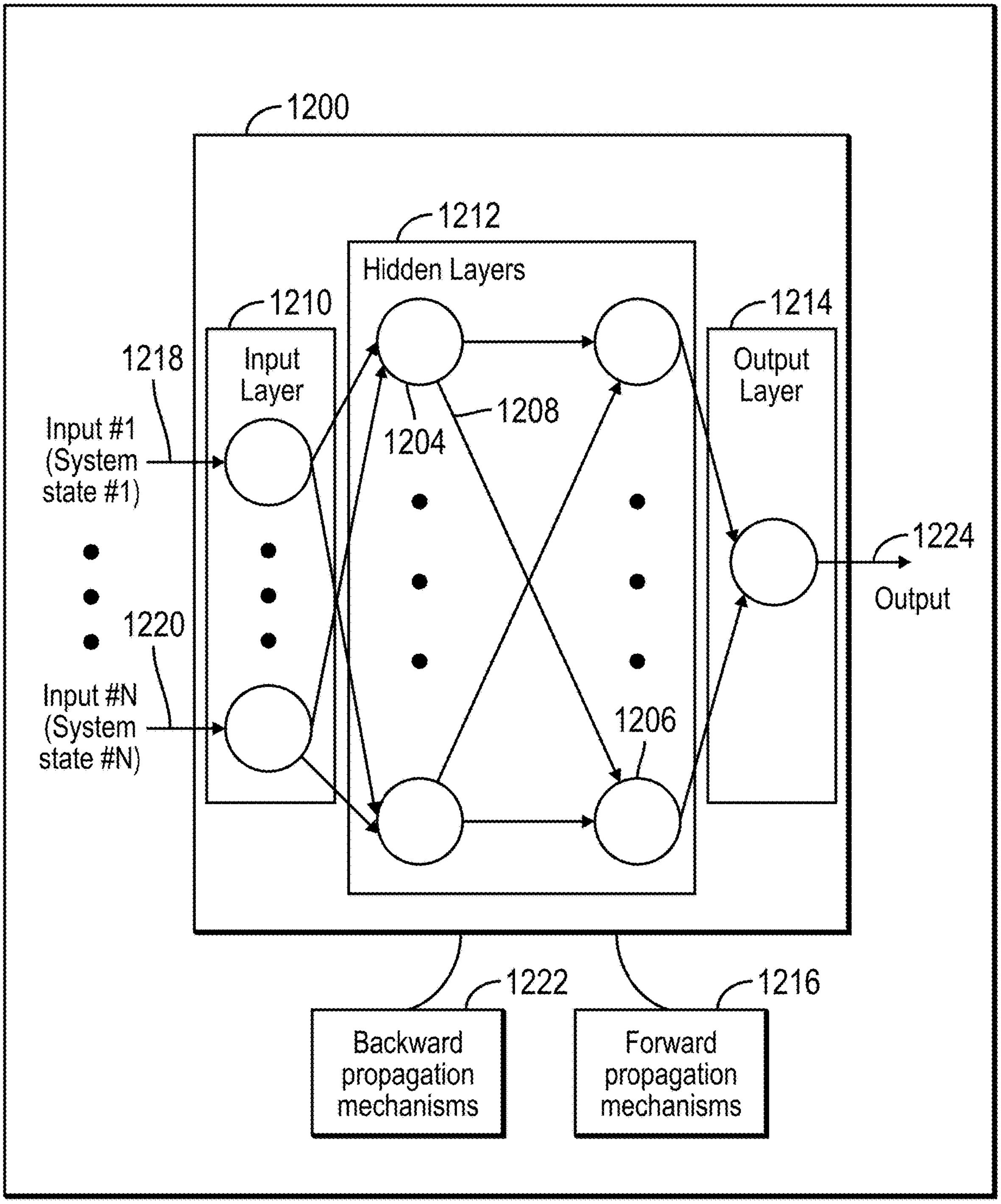
FIG. 12 illustrates, in a block diagram, details of a machine learning model in accordance with certain embodiments.

FIG. 12 illustrates, in a block diagram, details of a machine learning model 1200 in accordance with certain embodiments. In certain embodiments, the knowledge-based segmentation model 220 and/or the AI predictive model 230 are implemented using the components of the machine learning model 1200.

The machine learning model 1200 may comprise a neural network with a collection of nodes with links connecting them, where the links are referred to as connections. For example, FIG. 12 shows a node 1204 connected by a connection 1208 to the node 1206. The collection of nodes may be organized into three main parts: an input layer 1210, one or more hidden layers 1212, and an output layer 1214.

The connection between one node and another is represented by a number called a weight, where the weight may be either positive (if one node excites another) or negative (if one node suppresses or inhibits another). Training the machine learning model 1200 entails calibrating the weights in the machine learning model 1200 via mechanisms referred to as forward propagation 1216 and backward propagation 1222. Bias nodes that are not connected to any previous layer may also be maintained in the machine learning model 1200. A bias may be described as an extra input of 1 with a weight attached to it for a node.

In forward propagation 1216, a set of weights are applied to the input data 1218 . . . 1220 to calculate the output 1224. For the first forward propagation, the set of weights may be selected randomly or set by, for example, a system administrator. That is, in the forward propagation 1216, embodiments apply a set of weights to the input data 1218 . . . 1220 and calculate an output 1224.

In backward propagation 1222 a measurement is made for a margin of error of the output 1224, and the weights are adjusted to decrease the error. Backward propagation 1222 compares the output that the machine learning model 1200 produces with the output that the machine learning model 1200 was meant to produce, and uses the difference between them to modify the weights of the connections between the nodes of the machine learning model 1200, starting from the output layer 1214 through the hidden layers 1212 to the input layer 1210, i.e., going backward in the machine learning model 1200. In time, backward propagation 1222 causes the machine learning model 1200 to learn, reducing the difference between actual and intended output to the point where the two come very close or coincide.

The machine learning model 1200 may be trained using backward propagation to adjust weights at nodes in a hidden layer to produce adjusted output values based on the provided inputs 1218 . . . 1220. A margin of error may be determined with respect to the actual output 1224 from the machine learning model 1200 and an expected output to train the machine learning model 1200 to produce the desired output value based on a calculated expected output. In backward propagation, the margin of error of the output may be measured and the weights at nodes in the hidden layers 1212 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 1200 is configured to repeat both forward and backward propagation until the weights of the machine learning model 1200 are calibrated to accurately predict an output.

The machine learning model 1200 implements a machine learning technique such as decision tree learning, association rule learning, artificial neural network, inductive programming logic, support vector machines, Bayesian models, etc., to determine the output value 1224.

In certain machine learning model 1200 implementations, weights in a hidden layer of nodes may be assigned to these inputs to indicate their predictive quality in relation to other of the inputs based on training to reach the output value 1224.

With embodiments, the machine learning model 1200 is a neural network, which may be described as a collection of "neurons" with "synapses" connecting them.

With embodiments, there may be multiple hidden layers 1212, with the term "deep" learning implying multiple hidden layers. Hidden layers 1212 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1216 and the backward propagation 1222.

In backward propagation 1222, embodiments measure the margin of error of the output and adjust the weights accordingly to decrease the error.

Neural networks repeat both forward and backward propagation until the weights are calibrated to accurately predict the output 1224.

In certain embodiments, the inputs to the knowledge-based segmentation model 220 are items (images or videos), and the outputs of the knowledge-based segmentation model 220 are morphological segments. In certain embodiments, the knowledge-based segmentation model 220 may be refined based on whether the outputted recommendations, once taken, generate positive outcomes.

In certain embodiments, the inputs to the AI predictive model 230 are items (images or videos), and the outputs of the AI predictive model 230 are prediction labels. In certain embodiments, the AI predictive model 230 may be refined based on whether the outputted recommendations, once taken, generate positive outcomes.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program instructions embodied therewith, the program instructions executable by a computer processor to cause the computer processor to perform operations comprising:

training an Artificial Intelligence (AI) predictive model;

using the AI predictive model to generate a prediction label for each item of a plurality of input items;

selecting a target item from the plurality of input items, wherein the target item has an initial prediction label;

for a morphological segment, identifying a source item from the plurality of input items, wherein the source item shares common structural features with the target item and has a different prediction label;

generating a recombined item by:

masking the morphological segment in the target item; and adding the morphological segment of the source item over the masked morphological segment;

using the AI predictive model to generate a new prediction label for the recombined item;

determining that the new prediction label is different from the initial prediction label; and indicating that the recombined item is a counterfactual item, wherein the morphological segment of the source item changed the prediction label of the recombined item.

2. The computer program product of claim 1, wherein the program instructions are executable by the computer processor to cause the computer processor to perform further operations comprising:

training a knowledge-based segmentation model;

using the knowledge-based segmentation model to identify a plurality of morphological segments in the plurality of input items; and selecting the morphological segment from the plurality of morphological segments.

3. The computer program product of claim 1, wherein the program instructions are executable by the computer processor to cause the computer processor to perform further operations comprising:

assigning a feature importance score to the morphological segment of the counterfactual item.

4. The computer program product of claim 1, wherein the program instructions are executable by the computer processor to cause the computer processor to perform further operations comprising:

providing an interactive visualization with visual representations of item characteristics for a location of the morphological segment, an area of the morphological segment, a shape of the morphological segment, a color distribution of the morphological segment, and the area of the morphological segment over time.

5. The computer program product of claim 4, wherein the interactive visualization enables adjustment of user interface elements associated with the visual representations to obtain new visual representations of the item characteristics.

6. The computer program product of claim 1, wherein the program instructions are executable by the computer processor to cause the computer processor to perform further operations comprising:

creating a group based on comparison of a variable of the target item and of the counterfactual item.

7. The computer program product of claim 1, wherein the plurality of input items comprise images or videos.

8. A computer system, comprising:

one or more computer processors, one or more computer-readable memories and one or more computer-readable, tangible storage devices; and program instructions, stored on at least one of the one or more computer-readable, tangible storage devices for execution by at least one of the one or more computer processors via at least one of the one or more computer-readable memories, to perform operations comprising:

training an Artificial Intelligence (AI) predictive model;

using the AI predictive model to generate a prediction label for each item of a plurality of input items;

selecting a target item from the plurality of input items, wherein the target item has an initial prediction label;

for a morphological segment, identifying a source item from the plurality of input items, wherein the source item shares common structural features with the target item and has a different prediction label;

generating a recombined item by:

masking the morphological segment in the target item; and adding the morphological segment of the source item over the masked morphological segment;

using the AI predictive model to generate a new prediction label for the recombined item;

determining that the new prediction label is different from the initial prediction label; and indicating that the recombined item is a counterfactual item, wherein the morphological segment of the source item changed the prediction label of the recombined item.

9. The computer system of claim 8, wherein the operations further comprise:

training a knowledge-based segmentation model;

using the knowledge-based segmentation model to identify a plurality of morphological segments in the plurality of input items; and selecting the morphological segment from the plurality of morphological segments.

10. The computer system of claim 8, wherein the operations further comprise:

assigning a feature importance score to the morphological segment of the counterfactual item.

11. The computer system of claim 8, wherein the operations further comprise:

providing an interactive visualization with visual representations of item characteristics for a location of the morphological segment, an area of the morphological segment, a color distribution of the morphological segment, a shape of the morphological segment, and the area of the morphological segment over time.

12. The computer system of claim 11, wherein the interactive visualization enables adjustment of user interface elements associated with the visual representations to obtain new visual representations of the item characteristics.

13. The computer system of claim 8, wherein the operations further comprise:

creating a group based on comparison of a variable of the target item and of the counterfactual item.

14. The computer system of claim 8, wherein the plurality of input items comprise images or videos.

15. A computer-implemented method, comprising operations for:

training an Artificial Intelligence (AI) predictive model;

using the AI predictive model to generate a prediction label for each item of a plurality of input items;

selecting a target item from the plurality of input items, wherein the target item has an initial prediction label;

for a morphological segment, identifying a source item from the plurality of input items, wherein the source item shares common structural features with the target item and has a different prediction label;

generating a recombined item by:

masking the morphological segment in the target item; and adding the morphological segment of the source item over the masked morphological segment;

using the AI predictive model to generate a new prediction label for the recombined item;

determining that the new prediction label is different from the initial prediction label; and indicating that the recombined item is a counterfactual item, wherein the morphological segment of the source item changed the prediction label of the recombined item.

16. The computer-implemented method of claim 15, further comprising operations for:

training a knowledge-based segmentation model;

using the knowledge-based segmentation model to identify a plurality of morphological segments in the plurality of input items; and selecting the morphological segment from the plurality of morphological segments.

17. The computer-implemented method of claim 15, further comprising operations for:

assigning a feature importance score to the morphological segment of the counterfactual item.

18. The computer-implemented method of claim 15, further comprising operations for:

providing an interactive visualization with visual representations of item characteristics for a location of the morphological segment, an area of the morphological segment, a color distribution of the morphological segment, a shape of the morphological segment, and the area of the morphological segment over time.

19. The computer-implemented method of claim 18, wherein the interactive visualization enables adjustment of user interface elements associated with the visual representations to obtain new visual representations of the item characteristics.

20. The computer-implemented method of claim 15, further comprising operations for:

creating a group based on comparison of a variable of the target item and of the counterfactual item.

* * * * *